May 8, 1923.	E. PRENDERGAST	1,454,335
REPAIR LINK FOR CHAINS
Filed March 7, 1921
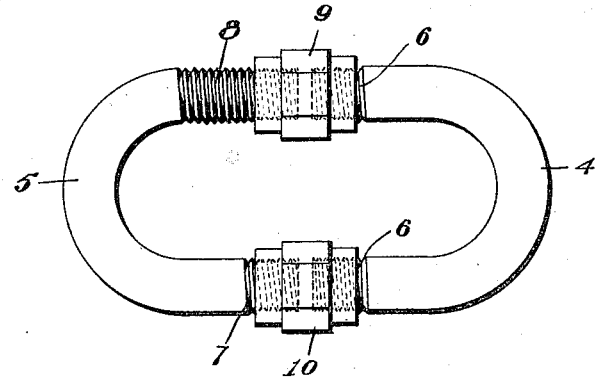
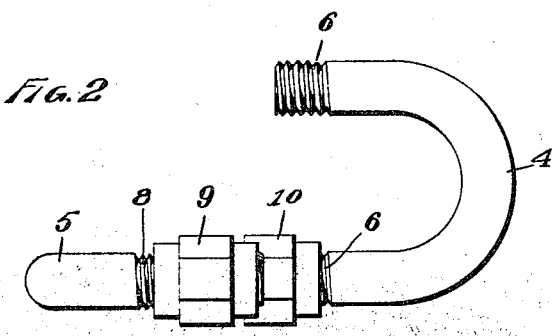
INVENTOR
EDWARD PRENDERGAST
BY Edward E. Lungan
ATTY.

Patented May 8, 1923.

1,454,335

UNITED STATES PATENT OFFICE.

EDWARD PRENDERGAST, OF ST. LOUIS, MISSOURI.

REPAIR LINK FOR CHAINS.

Application filed March 7, 1921. Serial No. 450,303.

*To all whom it may concern:*

Be it known that I, EDWARD PRENDERGAST, a citizen of the United States, and resident of the city of St. Louis and State of Missouri, have invented certain new and useful Improvements in Repair Links for Chains, of which the following is a specification containing a full, clear, and exact description, reference being had to the accompanying drawings, forming a part hereof.

My invention relates to improvements in repair links for chains and has for its primary object the construction of a link which may be easily inserted in a chain to take the place of a broken link without any blacksmithing operation.

In the drawings:

Fig. 1 is a plan view of my improved link closed.

Fig. 2 is a view of the link showing the section thereof disconnected at one end and one portion being swung so that the link may be inserted in the chain.

Referring to the drawings:

4 and 5 indicate the two sections out of which my link is composed, the section 4 being provided with screw-threaded ends 6 and the section 5 being provided with the screw-threaded ends 7 and 8, the screw-threaded end 8 extending farther back on the section 5 than the end 7. Mounted on the screw-threaded ends 6 and 8 is a nut 9, the nut 9 being capable of being seated past or beyond the end of the screw-threaded end 8. When it is desired to open the link, as illustrated in Fig. 2, the nut 9 is screwed down on the screw-threaded end 8 so that it is removed from the screw-threaded end 6, the section 5 may then be turned, as illustrated in Fig. 2, and the link inserted in the chain. After the link is inserted in the chain, the nut 9 is applied, as in Fig. 1. Screw seated on the ends 6 and 7 is a similar nut 10 for connecting these ends of the sections 4 and 5 of the link.

I found my improvement very useful in heavy work for the reason that if the link becomes broken, by the use of my improvement it can be readily repaired and the work proceeded with without the necessity of taking the chain or link to a blacksmith shop and delaying the work until it is repaired.

Having fully described my invention, what I claim is:

A repair link for chains formed of two independent U shaped sections, the ends of each section being screw threaded, sleeves mounted on the screw threaded ends for securing the sections together, one end of one section having its screw threads cut farther back than the threads on the remaining ends of the sections so that one of said sleeves may be fully seated on said section and clear the end of the opposing section so as to permit the turning of one section in the remaining sleeve whereby the link may be opened without the removal of either sleeve. sleeve.

In testimony whereof, I have signed my name to this specification.

EDWARD PRENDERGAST.